United States Patent Office 3,475,396
Patented Oct. 28, 1969

3,475,396
PROCESS FOR POLYMERIZING VINYLIDENE FLUORIDE
George H. McCain, Painesville, John R. Semancik, Richmond Heights, and Joseph J. Dietrich, Mentor, Ohio, assignors to Diamond Shamrock Corporation, a corporation of Delaware
No Drawing. Filed July 6, 1966, Ser. No. 563,021
Int. Cl. C08f 3/22, 15/06
U.S. Cl. 260—92.1          9 Claims

ABSTRACT OF THE DISCLOSURE

A process is described wherein vinylidene fluoride or mixtures thereof with up to 10 percent, by weight, of the monomer mixture of a fluorinated olefin of 3–8 C. atoms is polymerized in an aqueous medium under moderate pressure and at a temperature of 65°–85° C. in the presence of a water-soluble, fluorinated surfactant and, as the free-radical catalyst, diisopropyl peroxydicarbonate. The reaction is conducted for 0.5 hour to 6 hours. Substantial yields, i.e., up to approximately 100% conversion of high molecular weight polymer product is recovered as latex which is easily coagulated to free-flowing polymer powder.

---

This invention relates to the polymerization of vinylidene fluoride and, more particularly, relates to an aqueous polymerization process for preparing high molecular weight vinylidene fluoride polymers using diisopropyl peroxydicarbonate as the polymerization catalyst.

It has long been known to polymerize vinylidene fluoride to high molecular weight polymers in an aqueous medium, under extremely high pressures and in the presence of peroxy compounds as catalysts. In U.S. Patent 2,435,537, for example, the use of both inorganic peroxy compounds such as potassium persulfate and organic peroxides such as dibenzoyl peroxide and acetyl peroxide is described. Although inorganic peroxy compounds will effect vinylidene fluoride polymerization under these conditions in good yield, the polymer products obtained exhibit, for the most part, thermal stability and processing characteristics significantly inferior to polymers obtained with the organic peroxide catalysts. Although the organic peroxide catalysts as specified in the aforementioned patent generally provide better quality polymers, catalysts of this type as, for example, benzoyl or acetyl peroxide usually provide only relatively low yields of polymer, e.g., from 10% to 20%, even at extremely high pressures.

In U.S. Patent No. 3,193,539 there has been described the use of an organic peroxide catalyst, namely, ditertiary-butyl peroxide, to provide excellent yields of vinylidene fluoride polymer at pressures in the range of 300 to 1000 p.s.i.g. However, to provide reasonably effective yields of polymer employing di-tertiary-butyl peroxide, polymerization temperatures of 120° to 130° C. and reaction times of around 20 hours are required. Because of these high polymerization temperatures, equipment corrosion problems may be encountered and the long run times make the use of this catalyst commercially unattractive.

In a more recently issued patent, U.S. Patent No. 3,245,971, there is described the use of other organic peroxy compounds, i.e., certain dibasic acid peroxides which, like the aforementioned ditertiary-butyl peroxide, are capable of promoting vinylidene fluoride polymerization to high conversion at moderate pressures. However, processes employing these catalysts also require around 20 hours for optimum yields.

It has now been found that excellent yields of high molecular weight, thermally stable and easily processed vinylidene fluoride polymer can be obtained in an aqueous system at moderate pressures and short polymerization times, e.g., from 0.5 to 6 hours by using as the catalyst, diisopropyl peroxydicarbonate.

Accordingly, the present invention comprises polymerizing vinylidene fluoride in an aqueous medium containing small quantities of a fluorinated surfactant and in the presence of a catalytically effective amount of diisopropyl peroxydicarbonate; the said polymerization being conducted at pressures less than 1000 p.s.i.g., at a temperature of 65° to 85° C. and for a time period of from 0.5 to 6 hours. From this process there is obtained from 90% to 100% yields by weight of high molecular weight, thermally stable polymer which is useful for the production of coatings, films, fibers, moldings and other finished plastic articles as presently fabricated from commercial vinylidene fluoride polymers.

A particular advantage of the process of this invention is the fact that it provides high conversion of polymer in a much shorter reaction time than is possible when employing the previously described low pressure processes of the prior art. Thus, the process of this invention presents an economical, commercially attractive method for the preparation of vinylidene fluoride polymers.

As mentioned previously, the aqueous polymerization system herein contains a small quantity of a fluorinated surfactant. It has been found necessary to use the surfactant in order to realize optimum yields and quality in the polymer product. In principle, any fluorinated surfactant may be applied provided the hydrophobic portion thereof is at least half-fluorinated and contains from 5 to 15 carbon atoms; and the hydrophilic portion thereof is ionic in nature and exhibits water-solubilizing character, e.g., a carboxyl, phosphate, amine, sulfonic acid or water-soluble sulfonic acid salt group. In practice, however, the surfactants most advantageously employed are the perfluorinated surfactants. These surfactants conform to the general formula X(R)—Y, where X may be hydrogen, fluorine or chlorine; R is a perfluoroalkylene or perfluorochloroalkylene radical having from 6 to about 20 carbon atoms, preferably from 8 to about 15 carbon atoms; and Y is an ionic hydrophilic group. As a class, these surfactants include the perfluorocarboxylic acids or their water soluble salts, such as, e.g., perfluorooctanoic, perfluorononanoic or perfluorodecanoic acid and the alkali metal and ammonium salts thereof. Sodium perfluorooctanoate is the perfluorinated surfactant presently preferred in the process of this invention. The quality of surfactant employed must be sufficient to afford a true emulsion polymerization system and is employed generally in quantities of 2.0 to 6.0 percent, preferably from 3.0 to 5.0 percent, by weight of vinylidene fluoride. Optionally, a small amount of a water-soluble organic compound which serves as a chain transfer agent may also be used in the reaction. Chain transfer agents which may be used include, for example, ethylene oxide, propylene oxide, butylene oxide, methanol, n-propyl alcohol, n-butyl alcohol and the like. By additionally incorporating into the polymerization system a small quantity of a water-soluble chain transfer agent, it is possible to use a significantly reduced quantity of surfactant and obtain polymer products of equally desirable properties. For instance, by incorporating from 0.005 to 1.0 percent of the chain transfer agent, by weight of monomer, optimum yields of polymer thus may be obtained by employing the surfactant in a concentration of about 0.5 to 3.0 percent, by weight of monomer. These polymer products exhibit at least equivalent, if not still further improved thermal stability by comparison to polymers prepared with the use of surfactant alone. Of particular advantage is the fact that by incorporating the chain transfer agent in the polymerization system with the concommitant reduction of surfactant requirement, production costs for the polymer may be significantly reduced.

As set forth previously, the aqueous polymerization process of this invention generally can be carried out in about 0.5 to 6 hours at moderate pressures of less than 1000 p.s.i.g., preferably about 300 to 800 p.s.i.g. and at reaction temperatures of 65° to 85° C. For optmium yields of polymer, the reaction is effected preferably at a temperature of 70° to 80° C., particularly 75° C., at a pressure of 500 to 600 p.s.i.g. and in a reaction time of 2 to 6 hours. The fact that high conversions are obtained using diisopropyl peroxydicarbonate at these reaction temperatures is indeed surprising since it has been reported in the literature (U.S. Patent No. 3,022,282) that polymerization processes using this compound as sole catalyst tend to die out significantly short of the desired conversion at temperatures above about 55° C. Further, the half-life of this catalyst at a temperature of 75° C. has been predicted at about 12 minutes. The fact that optimum yields of polymer are obtained with this catalyst at polymerization temperatures higher than reported or predicted cannot presently be explained but it is believed that an interaction between the catalyst, the chain transfer agent and/or the surfactant permits higher conversion at temperatures which are much higher than are predicted from half-life data for the catalyst.

The amount of diisopropyl peroxydicarbonate employed in the polymerization recipe under the stated reaction conditions is somewhat critical and cannot be varied over wide limits if optimum yields of high quality polymer are obtained.. The catalyst concentration employed should range from 0.125 to about 1.0 percent by weight of total monomer, with the preferred concentration ranging from 0.25 to about 0.5 percent by weight of monomer.

Generally, the catalyst may be introduced into the polymerization system either as a solid or as a solution in an organic liquid compatible, i.e., soluble, dispersible or miscible, therewith. Such liquids can be either aliphatic or aromatic hydrocarbons, e.g., cyclohexane, heptane, benzene, toluene, or xylene; esters, ethers, or chlorinated hydrocarbons.

In carrying out the polymerization, an aqueous medium, preferably de-oxygenated, de-ionized water, is charged to the reactor, maintained at a temperature below about 20° C., together with the diisopropyl peroxydicarbonate, the surfactant and optionally the chain transfer agent. Then the reactor is purged or swept out with an inert gas such as nitrogen. The reactor is then charged with vinylidene fluoride under superatmospheric pressure. The temperature of the reaction mixture is then raised in about 15 to 30 minutes to the desired polymerization temperature. The pressure is maintained at the desired level, e.g., 300 to 800 p.s.i.g. by the periodic addition of the aqueous medium. During the reaction the reactor contents are preferably agitated by an internal agitator.

When the surfactant is employed alone in the process, the polymer product recovered from the reactor is in the form of a dispersion or latex wherein the polymer particles are colloidal in size, e.g., 0.05 to 0.5 microns. These polymer dispersions may then be coagulated by any of the known methods in the art to obtain the polymer as a free-flowing powder. Alternatively, when a chain transfer agent is included in the polymerization mixture along with the surfactant, the polymer product recovered from the reactor is in the form of a fine aqueous suspension, and may be isolated simply by filtration or centrifuging. The finished polymer products of the present invention are high molecular weight polymers as evidenced by their flow numbers of 1200 to 3000.

The term "flow number," which may also be designated as "plasticity number," denotes an empirical index which indicates the relative molecular weight of these polymers. The flow number of the polymer products of this invention is determined essentially as described in numerous U.S. patents, especially in Nos. 3,193,539 and 3,245,971. Specifically, as used herein, the flow number defines the area in square millimeters ($mm.^2$) of a flat molding of the polymer made by placing 0.5 g. of the dry polymer between platens of a Pasadena Press maintained at 225° C. The platens are brought together to compress the powder under pressure (less than 50 p.s.i.g.) and the powder is preheated in this manner at 225° C. for 30 seconds. A pressure of 2500 pounds is then applied for 60 seconds at a platen temperature of 225° C. The greater the area of the flat moldings so produced, the higher the flow number and the lower the molecular weight of the polymer. To have practical utility, the vinylidene fluoride polymers should have flow numbers of 3000 or lower.

To determine the thermal stability of the polymers, specimen moldings are prepared under pressure at temperatures of 325° F. and 450° F. These are examined visually for clarity, color, bubbling, etc. and compare favorably to similarly molded specimens of commercial vinylidene fluoride polymers.

The high molecular weight vinylidene polymers prepared by the process of this invention are fabricated by shaping techniques presently practiced in the art, e.g., extrusion, injection molding or compression molding. They are also suitable for the production of fibers and films by melt extrusion or by casting from solutions in appropriate pseudo-solvents. Having excellent chemical resistance, the polymers are likewise useful for the formation of protective coatings, being easily applied from organic or aqueous dispersions onto the substrates by spraying, brushing or dipping.

The process of this invention may also be employed for the preparation of copolymers containing a major percentage of vinylidene fluoride in combination with minor percentages, e.g., 1% to 10% by weight, of other fluorinated monomers especially the fluorinated olefins higher than ethylene containing up to about 8 carbon atoms. Examples of such suitable monomers may include 2-fluoropropene, 2-trifluoromethylpropene and perfluoro-2-butene. These copolymer products exhibit good thermal stability.

In order that those skilled in the art may more completely understand the present invention and the preferred methods by which the same may be carried into effect, the following specific examples are offered.

EXAMPLE 1

A one-gallon stainless steel autoclave pre-chilled to 15° C. is charged with 740 g. of de-oxygenated de-ionized water, 2.59 g. of diisopropyl peroxydicarbonate and 13.0 g. of sodium perfluorooctanoate (one-half the total quantity of surfactant). The autoclave is evacuated, cooled in a Dry Ice-acetone bath and then charged with 518.4 g. of vinylidene fluoride by transfer bomb under vacuum. The autoclave and the agitated contents are then brought rapidly up to a temperature of about 75° C. (in about 15 minutes) by means of an internal heating coil heated by a circulating oil bath. The remaining 13.0 g. of sodium perfluorooctanoate surfactant along with water is introduced at a steady rate by means of a water pump connected to the autoclave. During the reaction (a total of 5 hours) a pressure of 600 p.s.i.g. is maintained on the reaction mixture by periodically pumping in de-oxygenated de-ionized water as needed.

After the reaction, the water pump is shut down, the autoclave is cooled, vented and opened. The polymer latex is removed and the polymer product is isolated by freezing the latex. The polymer product is separated by filtration, washed thoroughly with distilled water and finally dried at 50° C. under vacuum. The dried polymer product weighs 482 g. (93% monomer conversion). The flow number of this product determined as described hereinabove is 1520. When molded at 325° F. and 450° F. it yields colorless films which are strong and tough.

EXAMPLE 2

Using the procedure as described in Example 1, a vinylidene fluoride polymer is prepared in 5 hours at a temperature of 75° C. and a pressure of 600 p.s.i.g. In this experiment, the proportions of all ingredients used is the same as in Example 1 with the exception of the diisopropyl peroxydicarbonate. In this example, 1.295 g. of the catalyst is used (0.25%, by weight of total monomer). The polymer product is isolated, washed and dried as described in Example 1. The total polymer obtained is 492 g. (95% monomer conversion). The polymer product has a flow number of 1260 and produces a colorless molding at 450° F.

EXAMPLE 3

The general procedure of Example 1 is repeated with the same quantities of de-oxygenated, de-ionized water, vinylidene fluoride monomer, diisopropyl peroxydicarbonate and sodium perfluorooctanoate. Additionally, 0.06 g. of ethylene oxide is added to the water initially as chain transfer agent (equivalent to 0.01% ethylene oxide, by weight of total monomer). The reaction is conducted at 75° C. and a pressure of 600 p.s.i.g. After the reaction mixture is raised to the reaction temperature, the reaction is continued for an additional 45 minutes, making a total reaction time of 1 hour. The yield of polymer product is 87%, by weight of total monomer. This polymer has a flow number of 2120 and produces completely colorless films and moldings when molded at 325° F. and 450° F. as previously described.

EXAMPLE 4

The experiment as described in Example 3 is repeated with the same proportions of ingredients and reaction conditions except that the total reaction time is 4 hours. The polymer which is recovered in 90% yield has a flow number of 1810. It produces colorless films and moldings when molded at 325° F. and 450° F. as previously described.

EXAMPLE 5

A vinylidene fluoride polymer is prepared following the general procedure and using the same quantities of reaction ingredients as described in Example 1. In this example, however, 0.01%, by weight of total monomer of ethylene oxide is included and 5.18 g. of sodium perfluorooctanoate (1.0%, based on monomer weight) is employed. The total reaction time is 2 hours. The polymer product which is recovered as a fine suspension is isolated by filtration, washed several times with water and finally dried under vacuum. There is obtained 409 g. (79% yield) of free flowing polymer which has a flow number of 1260. Films and moldings prepared at 325° F. and 450° F. are colorless, strong and tough.

EXAMPLE 6

To compare the physical properties of vinylidene fluoride polymers of this invention with those exhibited by commercially available vinylidene fluoride polymeric materials, each of the polymer products of Examples 1 to 4 was extruded at 470° F., pelletized and fabricated into test specimens by injection molding. Samples of two types of commercial polymer were similarly molded. Testing in accordance with the indicated ASTM procedures gave the following values.

| Polymer Product | Tensile Strength,[1] p.s.i. | Tensile Modulus,[1] p.s.i.×10³ | Elongation, Percent | Flex Strength at 5% Def.,[2] p.s.i. | Flex Modulus,[2] p.s.i.×10³ | Hardness Shore D [3] |
|---|---|---|---|---|---|---|
| Example 1 | 6,638 | 116 | 68 | | | 79 |
| Example 2 | 6,973 | 122 | 86 | | | 78 |
| Example 3 | 6,310 | 139 | 101 | 8,576 | 210 | 77 |
| Example 4 | 6,348 | 131 | 70 | 8,557 | 206 | 77 |
| Kynar* Type 1875 Pellets | 6,184 | 95 | 86 | 7,600 | 193 | 74 |
| Kynar* Type 1875 Powder | 6,284 | 117 | 87 | | | 74 |
| Kynar* Type L-1900 Pellets | 7,122 | 116 | 78 | | | 77 |

[1] ASTM D-638-61T.
[2] ASTM D-790-63.
[3] ASTM D-1706-61.
*Kynar—Reg. Trade Mark—Pennsalt Chemicals Corp.

As the above values indicate, the polymer products of this invention compare favorably with commercial vinylidene fluoride polymer products.

EXAMPLE 7

A 250-ml. stirred autoclave is pre-chilled to 15° C. and charged with 100 ml. de-oxygenated, de-ionized water, 0.16 g. of diisopropyl peroxydicarbonate and 1.5 g. of sodium perfluorooctanoate. The autoclave is then evacuated and charged with 30.5 g. of vinylidene fluoride and 5.2 g. of perfluoro-2-butene monomer by transfer bombs under vacuum. The reaction contents are then warmed rapidly to 75° C. and 157 ml. of water and 7.5 ml. of a 2% aqueous solution of the surfactant are introduced. The reaction is then continued at 600 p.s.i.g. for a total reaction time of 5 hours. The dried polymer product (recovered in 45% yield) contains about 5% of perfluoro-2-butene, by weight. It has a flow number of 2830. Films prepared from this copolymer at 450° F. are thermally stable, showing no evidence of any thermal degradation.

It is to be understood that although the invention has been described with specific reference to particular embodiments thereof, it is not to be so limited, since changes and alterations therein may be made which are within the full intended scope of this invention as defined by the appended claims.

What is claimed is:

1. A process for the production of high molecular weight vinylidene fluoride polymer which comprises (1) initially charging to an agitated reaction vessel desoxygenated water, diisopropyl peroxydicarbonate catalyst, a water-soluble fluorinated surfactant and vinylidene fluoride monomer; (2) thereafter heating the agitated reaction mixture to a temperature of 65°–85° C.; (3) maintaining the reaction mixture within said temperature range and under a pressure of 300 to 1000 p.s.i.g. for a time period for from 0.5 to 6 hours while the monomer is continuously converted to polymer; and (4) finally recovering, in latex form, high molecular weight vinylidene fluoride polymer in greater than 75 percent yield.

2. The process of claim 1 wherein the diisopropyl peroxydicarbonate is employed in an amount ranging from 0.125 to about 1.0 percent based on the total weight of monomer.

3. The process of claim 1 wherein the fluorinated surfactant is a perfluorinated compound having a water solubilizing group and a hydrophobic group selected from the group consisting of highly fluorinated and highly fluorochlorinated groups having 6 to 20 carbon atoms.

4. The process of claim 3 wherein the surfactant is employed in an amount ranging from 2 to 6 percent, based on the total weight of monomer.

5. The process of claim 1 wherein polymerization is conducted for 2 to 5 hours at 75° C. and 600 p.s.i.g.

6. The process of claim 1 wherein the polymerization reaction additionally contains a water-soluble chain transfer agent.

7. The process of claim 6 wherein the perfluorinated surfactant is employed in an amount based on the total weight of monomer of from 0.5 to 3 percent and the chain transfer agent is employed in an amount, based on the total weight of monomer, of from 0.005 to 1.0 percent.

8. The process of claim 6 wherein the perfluorinated surfactant is sodium perfluorooctanoate and the chain transfer agent is ethylene oxide.

9. The process of claim 1 where a monomer mixture is employed which consists essentially of vinylidene fluoride in combination with 1 to 10 percent by weight of the monomer mixture of a fluorinated olefin containing 3 to 8 carbon atoms.

References Cited

UNITED STATES PATENTS

| 2,843,576 | 7/1958 | Dunn et al. | 260—92.8 |
| 3,012,021 | 12/1961 | Hauptschein | 260—92.1 |
| 3,022,281 | 2/1962 | Smith | 260—92.1 |
| 3,193,539 | 7/1965 | Hauptschein | 260—92.1 |

JOSEPH L. SCHOFER, Primary Examiner

J. A. DONAHUE, Jr., Assistant Examiner

U.S. Cl. X.R.

260—87.7